No. 638,912. Patented Dec. 12, 1899.
M. J. CROSS.
FRUIT GATHERER.
(Application filed Aug. 19, 1899.)
(No Model.)
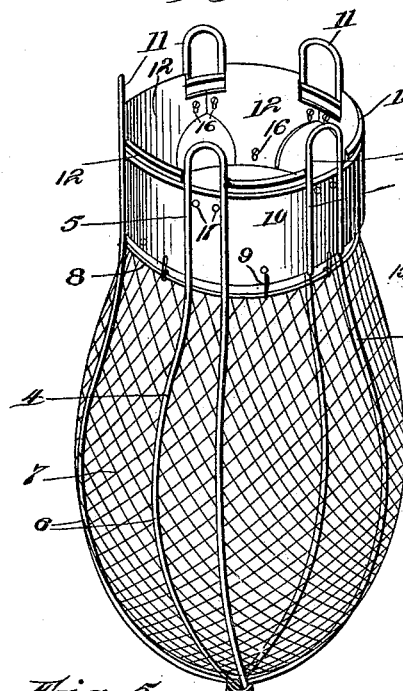
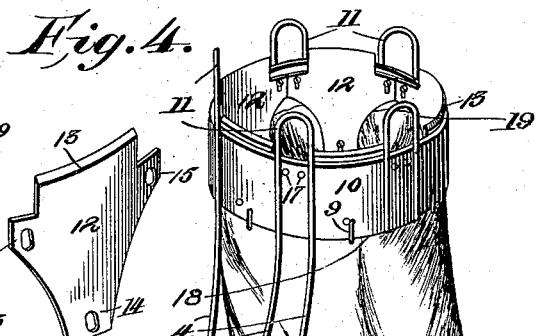
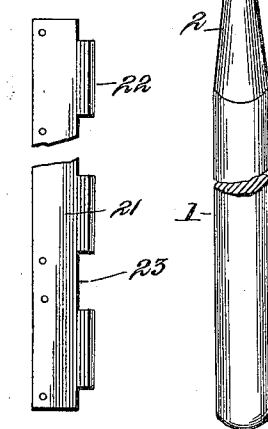
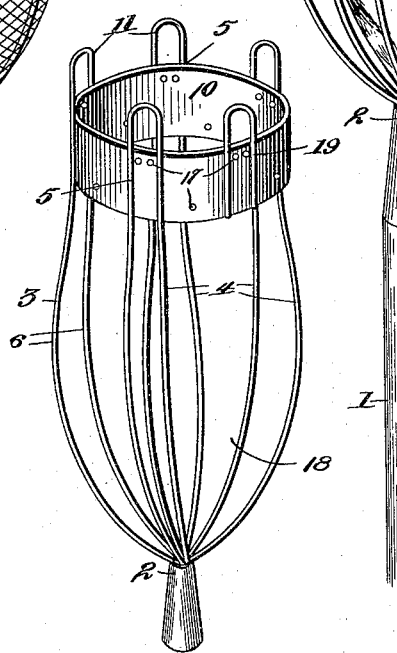
Witnesses
Mary J. Cross. Inventor
By her Attorneys,

UNITED STATES PATENT OFFICE.

MARY J. CROSS, OF DE WITT, IOWA.

FRUIT-GATHERER.

SPECIFICATION forming part of Letters Patent No. 638,912, dated December 12, 1899.

Application filed August 19, 1899. Serial No. 727,816. (No model.)

*To all whom it may concern:*

Be it known that I, MARY J. CROSS, a citizen of the United States, residing at De Witt, in the county of Clinton and State of Iowa, have invented a new and useful Fruit-Gatherer, of which the following is a specification.

My present invention relates to improvements in fruit-gatherers, and has for its object the production of a simple, efficient, and inexpensive device by means of which fruit may be gathered and safely deposited in a receptacle without bruising by persons standing below the tree and manipulating the gatherer through the instrumentality of a long handle.

The object of the invention in its specific aspect is the provision of a simple stem clipping or cutting device surmounting a band supported by a wire frame in a manner to permit of the attachment of either a wire fruit basket or holder or a flexible chute or tube, through which latter the fruit may be conveyed to a point distant from the tree.

Referring to the drawings, Figure 1 is a perspective view of my gatherer, showing the fruit-basket in place. Fig. 2 is a similar view showing the flexible chute attached. Fig. 3 is a detail perspective view of the cage and its band detached. Fig. 4 is a detail view of one of the knives; and Fig. 5 is a detail view of a knife-band designed for employment in lieu of the knives, one of which is illustrated in the preceding figure.

Referring to the numerals of reference employed to designate corresponding parts throughout the several figures of the drawings, 1 indicates a handle, preferably sectional and fitting at its upper end in a tapering or conical socket 2 of what I will term the "cage" 3 of the gatherer. This cage comprises a plurality of longitudinally-disposed wire loops 4, having their upper portions 5 arranged parallel, and their portions intermediate of the parallel portions 5 and the socket 2, to which their lower ends are connected, are outwardly curved, as indicated at 6, to accommodate a substantially egg-shaped fruit-receptacle 7. This receptacle is preferably composed of woven wire, and its open end is surrounded by a throat wire or bead 8, designed to be supported by hooks 9, depending from the knife-collar 10, to which they are secured and which serves as a spacing and supporting device for the parallel upper ends of the loops 4. The upper extremities of the cage-loops are extended above the collar 10 to form guides 11, intermediate of which are arranged knives 12. These knives may be constructed in a number of ways; but I prefer to provide them with beveled upper edges 13 coextensive with the spaces between the guides, a slotted tailpiece 14, and slotted lateral wings 15, the several slots in these knives or knife-plates being designed for the reception of adjusting-screws 16, which pass through the knives from the inner side and into screwthreaded apertures 17 in the knife-collar. In order to facilitate the attachment of the fruit-receptacle, a loop 4 is omitted to provide an enlarged opening 18 at one side of the cage; but in order to complete the series of guides projecting above the knife-collar 10 an inverted-U-shaped guide 19 is employed midway between the guides 11 of the two adjacent loops of the cage.

In lieu of the receptacle, which, as stated, is detachable from the knife-collar, I may prefer to employ in some instances an elongated flexible tube or conveyer 20, designed to extend into the cage through the opening 18 and to have its upper edge supported contiguous to the lower edge of the knife-collar by the hooks 9. I may also employ in lieu of the knife-plates 12 a knife-band 21, longitudinally coextensive with the circumference of the knife-collar and provided with a series of knife-edges 22, defined between intermediate spaces 23 for the accommodation of the knives, or, if desired, the knife-edge may be made continuous, inasmuch as the stem-guides are located upon the outside of the collar and the knife-band is designed for employment upon the inside thereof.

In operation, the sectional handle being made up of a sufficient number of sections to obtain the required length, the operator, grasping the handle at its lower end, presents the knife-edges 13 by an upward thrust to the stems of the fruit guided to the knife-edges by the guides 11. The stems being severed, the fruit drops through the knife-collar into the receptacle or through the chute 20, as the case may be, and is either deposited in the basket or receptacle or is conveyed through the chute to the barrel or other depository.

From the foregoing it will be observed that I have devised a simple and highly-efficient fruit-gathering device, and while the present embodiment of my invention appears at this time to be preferable I do not desire to be limited to the structural details defined, but reserve the right to change, modify, or vary them at will within the scope of the protection prayed.

What I claim is—

1. In a fruit-gatherer, the combination with a support or handle, of a cage having an upper open end, a knife-band carried at the upper end of the cage, knife-blades provided upon the band, and having their cutting edges projecting above the latter, and a receptacle located within the cage, and detachably suspended from the lower edge of the knife-band, substantially as set forth.

2. In a fruit-gatherer, the combination with a handle or support, of a cage having an upper open end, a knife-band carried at the upper end of the cage, knife-blades having slotted wings and tailpieces, and fastening devices passing through the band and the slots of the blade, and adjustably securing the latter to the band, substantially as set forth.

3. In a fruit-gatherer, the combination with a socket, of a cage formed by a plurality of substantially parallel loops having their ends secured within the socket and provided respectively with parallel portions at their upper ends and with curved portions intermediate of said ends and socket, a knife-collar carried by the parallel portions of the loops and having its upper edge below the extremities thereof, adjustable knives between the guides formed by the extended ends of the loops, a guide located intermediate of the upper ends of two loops, below which last-named guide the cage is formed in an opening, and a detachable fruit-receptacle having its walls supported by the loops of the cage, and means for detachably connecting the upper edge of the receptacle with the knife-collar, substantially as specified.

4. In a fruit-gatherer, the combination with a handle or support, of a cage having an upper open end, a knife-band provided at the upper end of the cage, spaced guides projecting above the upper edge of the knife-band, and detachable knife-blades located between respective guides, having their cutting edges projecting above the knife-band, and provided with lateral oppositely-extending wings abutting against the respective wings of adjacent blades, and maintaining the latter in their relative spaced positions, substantially as set forth.

5. In a fruit-gatherer, a support or handle, a cage carried by the latter, having an upper open end and also provided with a lateral opening, a knife-band provided at the upper open end of the cage, knife-blades carried by the band, and a receptacle and a conveyer, both of the latter having detachable and intercheangable engagements with the knife-band, and also located within the cage, and the conveyer to extend through the lateral opening of the cage, substantially as set forth.

In testimony that I claim the foregoing as my own I have hereto affixed my signature in the presence of two witnesses.

MARY J. CROSS.

Witnesses:
RICHARD J. CROUCH,
ULYSSES S. BUNNER.